United States Patent [19]

Pierce

[11] 3,947,062
[45] Mar. 30, 1976

[54] VEHICLE BUMPER CONVERTIBLE TO A TOW BAR

[76] Inventor: Harless Pierce, 1212 W. Longview Ave., Stockton, Calif. 95207

[22] Filed: Apr. 7, 1975

[21] Appl. No.: 565,936

[52] U.S. Cl............ 293/69 R; 280/491 D; 280/505
[51] Int. Cl.² ...................... B06D 1/16; B60R 19/02
[58] Field of Search........ 293/69 R, 69 E, 69 V, 99; 280/500, 505, 493, 491 R, 491 A, 491 B, 491 C, 491 D, 491 E, 491 F

[56] References Cited
UNITED STATES PATENTS

| | | | |
|---|---|---|---|
| 2,995,386 | 8/1961 | Peterson | 280/491 D |
| 3,147,027 | 9/1964 | Bronleewe | 280/491 D |
| 3,419,285 | 12/1968 | Morehouse et al. | 293/69 R X |
| 3,572,765 | 3/1971 | Tieben | 280/491 D |
| 3,704,900 | 12/1972 | Gerber | 280/491 D |
| 3,774,949 | 11/1973 | Eger | 293/69 R |

Primary Examiner—Drayton E. Hoffman
Assistant Examiner—Charles A. Marmor
Attorney, Agent, or Firm—Roger B. Webster

[57] ABSTRACT

A vehicle bumper—especially designed but not limited for use on utility or sport vehicles such as the "Jeep"—comprised of a combination of parts normally forming a rigid transverse bumper but readily adjustable to a mode in which such parts, upon attachment of a towing socket, provide a forwardly projecting tow bar.

10 Claims, 8 Drawing Figures

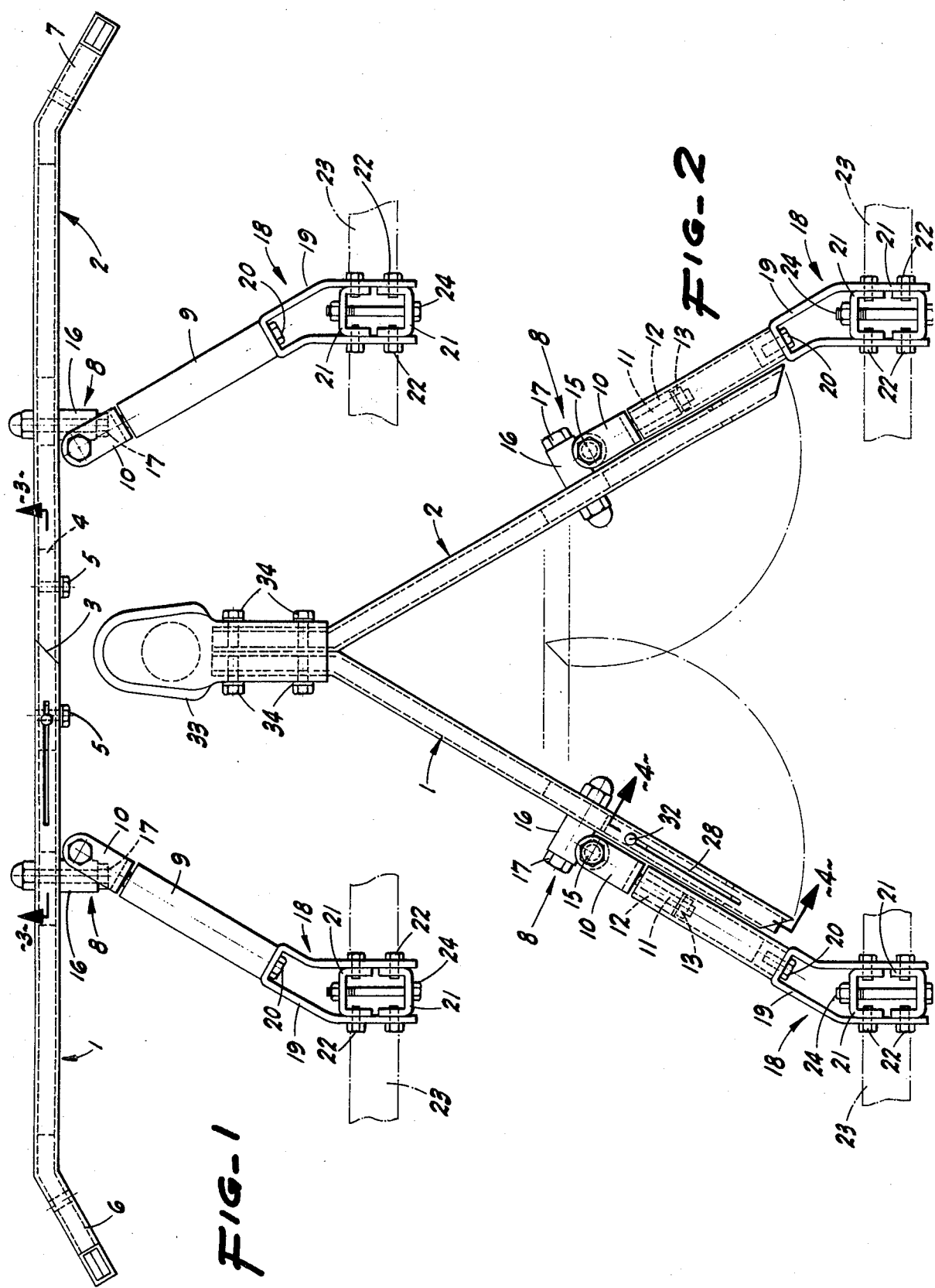

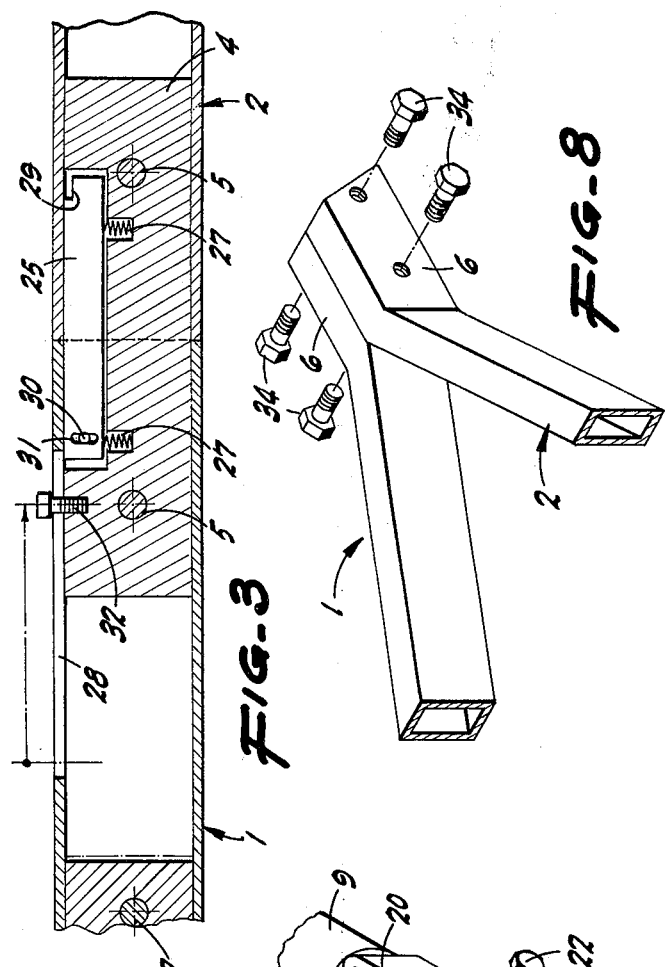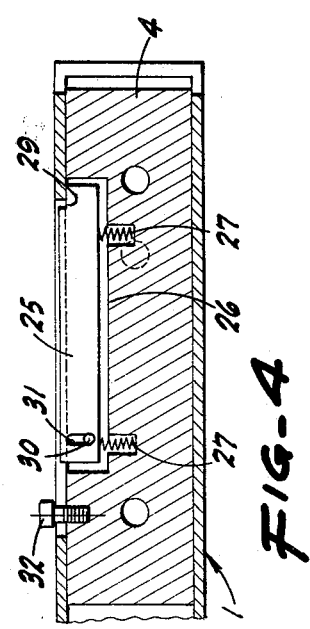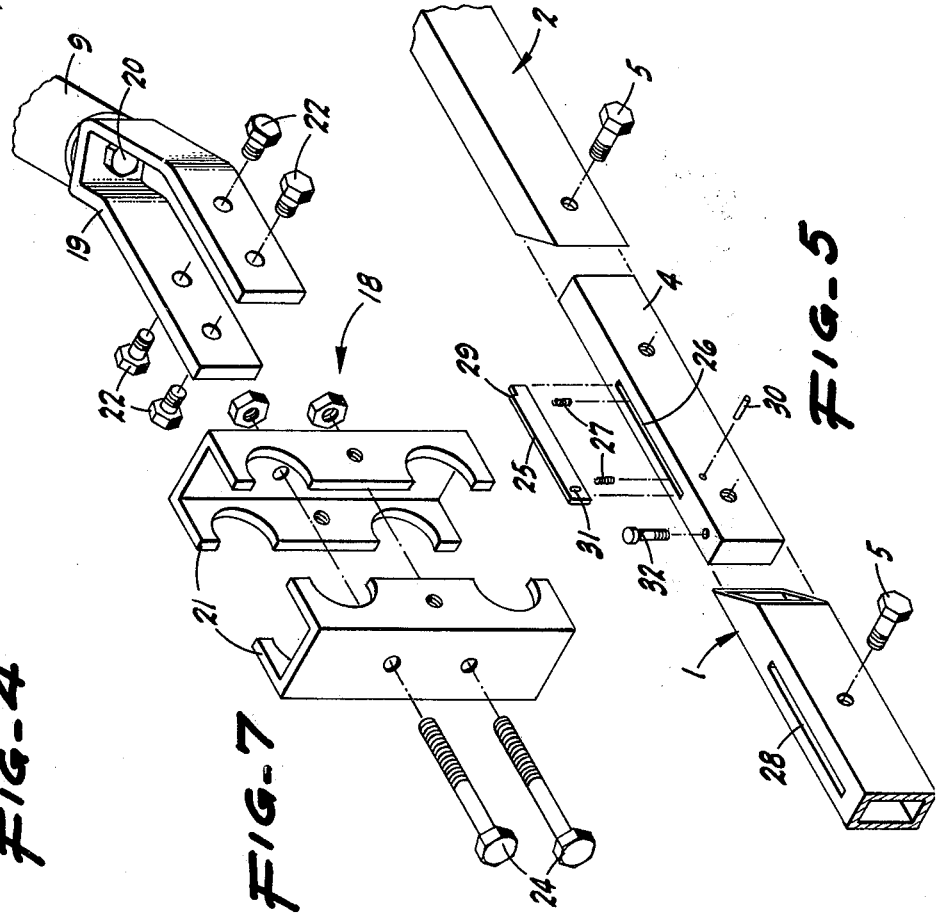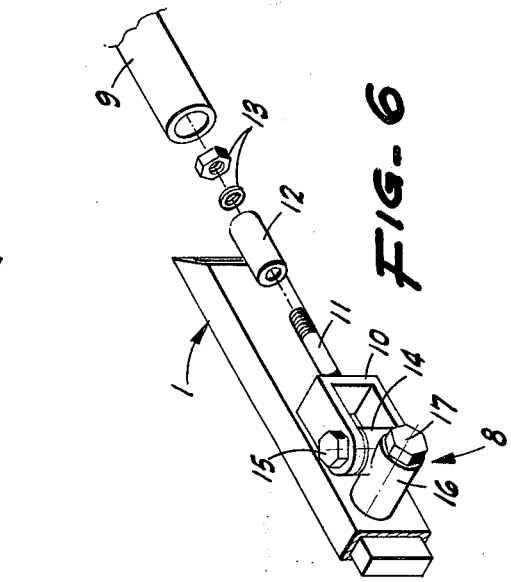

3,947,062

VEHICLE BUMPER CONVERTIBLE TO A TOW BAR

BACKGROUND OF THE INVENTION

Heretofore it has been common practice to provide tow bars normally detached from the vehicle and hence subject to the inconvenience of attachment prior to use, or—if normally vehicle-mounted—the tow bar is usually up-folded and secured in an upstanding but unattractive transport position. The present invention was conceived in a successful effort to provide a tow bar which wholly avoids the need of the tow bar being either normally detached, or vehicle-mounted and normally secured in an upfolded position.

SUMMARY OF THE INVENTION

The present invention provides, as a major object, a vehicle bumper convertible to a tow bar, which embodies—in novel array—parts normally forming a rigid transverse bumper but readily adjustable to a mode in which such parts, upon attachment of a towing socket, provide a forwardly projecting tow bar.

The present invention provides, as another important object, a vehicle bumper convertible to a tow bar, as in the preceding paragraph, wherein the conversion from a transverse bumper to a forwardly projecting tow bar can be manually accomplished readily and speedily, and with a minimum of tools—usually only a wrench or two of bolt-head or nut-engaging type.

The present invention provides, as still another important object, a vehicle bumper convertible to a tow bar, wherein the conversion does not require any change of the mount on nor the connection with the vehicle; all positional changes, in the array of parts comprising the bumper, being made within the confines of such array.

The present invention provides, as a further object, a vehicle bumper convertible to a tow bar which is designed for ease and economy of manufacture.

The present invention provides, as a still further object, a practical, reliable, and durable vehicle bumper convertible to a tow bar, and one which is exceedingly effective for the purpose for which it is designed.

BRIEF DESCRIPTION OF THE DRAWINGS:

FIG. 1 is a plan view showing the parts forming a bumper.

FIG. 2 is a plan view showing the parts forming a tow bar.

FIG. 3 is a fragmentary sectional elevation taken substantially on line 3—3 of FIG. 1.

FIG. 4 is a fragmentary sectional elevation taken substantially on line 4—4 of FIG. 2.

FIG. 5 is a fragmentary exploded view showing, together with adjacent portions of the bumper sections the slide bar and associated parts.

FIG. 6 is a fragmentary exploded view showing, together with a portion of one bumper section and a portion of the corresponding tubular arm in the tow bar position, one of the pivotal connection units.

FIG. 7 is a fragmentary exploded view showing the parts which comprise one of the clamping assemblies.

FIG. 8 is a fragmentary perspective view showing the forward end portion of the tow bar as formed by the bumper sections; the towing socket being omitted.

DESCRIPTION OF THE PREFERRED EMBODIMENT

Referring now more particularly to the drawings and to the characters of reference marked thereon, the vehicle bumper convertible to a tow bar comprises a pair of elongated bumper sections, indicated at 1 and 2, normally disposed transversely in oppositely extending directions and with their adjacent ends in abutment. Such adjacent abutting ends of the bumper sections 1 and 2 are formed so that they engage with a diagonal line of abutment, as at 3.

The sections 1 and 2 are of hollow beam form, and their adjacent or inner end portions are normally secured together by a slide bar 4 disposed within such end portions and spanning therebetween; i.e., over the diagonal line of abutment 3. Removable bolts 5 releasably secure the slide bar 4 in such spanning relation, and hence normally connect the bumper sections 1 and 2 in rigid relation.

The outer ends or tips 6 and 7 of the bumper sections 1 and 2, respectively, are bent rearwardly to a predetermined rearward and outward angle for the purpose to be later described herein.

Intermediate their ends, the bumper sections 1 and 2 are each secured—in supported relation—by a corresponding, normally coupled, connection unit, indicated generally at 8, carried on the forward end of the related one of a pair of forwardly projecting, substantially horizontal, tubular arms 9 which converge in a forward direction. As such connection units 8 are identical—except for being right and left hand—a description of one will suffice for both.

Each connection unit 8 comprises a horizontally open clevis 10 disposed ahead of the related tubular arm 9; the clevis having a rearwardly extending spindle 11 which is journaled in a longitudinal bearing sleeve 12 secured in the front end portion of said tubular arm 9. A nut and washer assembly 13 on the inner end of spindle 11 prevents its escape from bearing sleeve 12.

The clevis 10 embraces a vertical bearing sleeve 14 to which the clevis is turnably attached by a vertical bolt 15; the bearing sleeve 14 being integral, in right angular relation, with a lateral bearing sleeve 16 projecting from the outer side of the tubular arm 9, and to which arm the bearing sleeve 16 is turnably attached by a transverse bolt 17.

At the rear ends thereof, each tubular arm 9 is attached to the forward end of the vehicle frame by a clamping assembly indicated generally at 18, and which is constructed as follows:

A somewhat U-shaped, rearwardly opening bracket 19 is rigidly secured, at its forward end, to the closed rear end of the related arm 9 by a bolt 20. The arms of the bracket 19 span and are secured to opposite sides of opposed clamps 21 by bolts 22; such clamps 21 being fixedly secured on cross members 23 of the vehicle frame by bolts 24.

With the foregoing arrangement of connection units 8, tubular arms 9, and clamping assemblies 18, the bumper—comprised of the sections 1 and 2—is normally rigidly maintained in a fixed, transverse position.

The conversion of the bumper to a tow bar, when desired, is accomplished as follows:

The retention bolts 5 are both first removed, and then the slide bar 4 is manually shifted in the direction of, and to a position entirely within, the bumper section 1. When this occurs, an elongated on-edge catch plate 25 snaps upwardly (see FIG. 4) from a groove 26 in slide bar 4, and in which groove the catch plate is normally wholly disposed (see FIG. 3). The catch plate 25, as it snaps upwardly under the influence of springs 27, enters a longitudinal slot 28 in the top of bumper section 1, and thus releasably latches the slide bar in bumper section 1.

As shown, the catch plate 25 is notched at one end, as at 29, and—when said plate 25 snaps upwardly—the notch catch-engages under the top of bumper section 1 beyond one end of slot 28 whereby to prevent said catch plate escaping upwardly from such slot; such escape being further precluded by a cross pin 30 in slide bar 4 (remote from notch 29) extending through a vertically elongated hole 31 in the catch plate. The slide bar 4 is properly positionally disposed in the bumper section 1 by a bolt 32 which projects upwardly from the slide bar and through the slot 28, with the bolt head above such slot.

With the bumper sections 1 and 2 disconnected from each other at adjacent ends, and with the slide bar 4 latched in place in section 1 as described, both of the bumper sections are then swung horizontally about bolts 15 as a vertical axis; such swinging motion being in a direction with the tips 6 and 7 moving forwardly and inwardly until the bumper sections assume a forwardly converging relation with said tips in side-by-side, matching abutment (see FIG. 2). The inner or thenrear portions of the bumper sections thence lie in parallelism closely alongside the tubular arms 9.

With the bumper sections disposed in forwardly converging relation, with the tips 6 and 7 matchingly abutting, a towing socket, indicated generally at 33, is secured to such abutting tips by bolts 34.

The bumper, as so converted to a tow bar, is ready for use with the towing socket engaging the conventional ball mounted on the rear of the towing vehicle.

When the tow bar is in use, the somewhat universal effect—provided by the bolts 17 as one axis, and the spindles 11 as another axis—compensates for both limited up-and-down motion of, and torque imposed on, the bumper sections 1 and 2 when the tow bar is in use.

In the hollow bumper sections 1 and 2, filler blocks are employed for the purpose of strengthening such sections at points where other parts attach.

From the foregoing description, it will be readily seen that there has been produced such a vehicle bumper convertible to a tow bar as substantially fulfills the objects of the invention, as set forth herein.

While this specification sets forth in detail the present and preferred construction of the vehicle bumper convertible to a tow bar, still in practice such deviations from such detail may be resorted to as do not form a departure from the spirit of the invention as defined by the appended claims.

I claim:

1. A front-end vehicle bumper, convertible to a longitudinally forwardly projecting tow bar having a towing socket at its front end, comprising a pair of normally transverse bumper sections having inner and outer ends, said bumper sections being spaced ahead of the vehicle and extending from adjacent inner end-to-end relation laterally in opposite directions, means detachably connecting the bumper sections at said adjacent inner ends, a pair of rigid, transversely spaced, longitudinal supporting arms corresponding to the bumper sections and disposed between the latter and the front of the vehicle, means rigidly securing the supporting arms at the rear to the vehicle, normally coupled connection means including vertical axis pivotal connections between the front of the supporting arms and corresponding bumper sections at points which permit of horizontal swinging of the latter, when detached at said adjacent inner ends, from said laterally extending positions to positions in longitudinally forwardly converging relation with said outer ends then foremost and in closely adjacent relation for reception of the towing socket, and means to detachably secure the towing socket on such foremost ends.

2. A vehicle bumper, as in claim 1, in which the bumper sections include outer end tips; such outer end tips, which comprise said foremost ends, being angled so that when said bumper sections are in forwardly converging relation, the tips lie side-by-side in abutment.

3. A vehicle bumper, as in claim 2, in which the towing socket securing means comprises bolts which detachably secure said abutting tips and the socket in rigid, unitary relation.

4. A vehicle bumper, as in claim 1, in which the detachable connecting means at adjacent inner ends of the bumper sections comprises a bar normally spanning from one section to the other, said sections being hollow beams into each of which the bar normally extends, and removable bolts securing the bar to both of said sections; the bar being slidable into one section upon removal of the bolts, and means to releasably hold the bar in said one section.

5. A vehicle bumper, as in claim 4, in which said releasable holding means includes a spring-pressed catch member; said one section having a catch receiving portion with which the catch member spring-engages when the bar is slid into such section.

6. A vehicle bumper, as in claim 1, in which said normally coupled connection means provides, in addition to said vertical axis pivotal connections, longitudinal axis pivotal connections between the supporting arms and corresponding bumper sections.

7. A vehicle bumper, as in claim 6, in which said normally coupled connection means provides, in addition to said vertical axis pivotal connections and said longitudinal axis pivotal connections, transverse axis pivotal connections between the supporting arms and corresponding bumper sections.

8. A vehicle bumper, as in claim 1, in which said normally coupled connection means comprises, between each supporting arm and the related bumper section, a horizontally open clevis disposed at the front of the supporting arm, a longitudinal spindle projecting rearwardly from the clevis and journaled in the supporting arm, a vertical bearing sleeve journaled in the clevis, and a horizontal, transverse bearing sleeve integral with the vertical bearing sleeve and journaled in connection with said one bumper section.

9. A vehicle bumper, as in claim 1, in which said normally coupled connection means attaches to the bumper sections intermediate the ends thereof whereby when said sections are in forwardly converging relation, rear portions thereof extend rearwardly of said vertical axis pivotal connections.

10. A vehicle bumper, as in claim 9, in which the supporting arms converge forwardly, and said rear portions of the bumper sections lie substantially parallel thereto.

* * * * *